(12) United States Patent
Kirimoto

(10) Patent No.: US 6,450,746 B1
(45) Date of Patent: *Sep. 17, 2002

(54) SCREW RETENTION DEVICE HAVING SERRATIONS

(75) Inventor: Kanji Kirimoto, Osaka (JP)

(73) Assignee: Shimano, Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/782,961

(22) Filed: Feb. 13, 2001

(51) Int. Cl.⁷ ................................................ F16B 39/10
(52) U.S. Cl. .............................. 411/95; 411/87; 411/97; 411/102; 411/410
(58) Field of Search ................................ 411/87, 92, 93, 411/95, 97, 102, 114, 120, 121, 522, 523, 248, 402, 403, 408, 410; 81/13

(56) References Cited

U.S. PATENT DOCUMENTS

| | | | |
|---|---|---|---|
| 969,543 A | * | 9/1910 | Lance |
| 1,029,103 A | * | 6/1912 | Christianson |
| 2,370,944 A | * | 3/1945 | Emerson |
| 2,423,918 A | * | 7/1947 | Wohlhieter |
| 2,955,690 A | * | 10/1960 | Bedford |
| 3,031,049 A | * | 4/1962 | Somville |
| 3,662,783 A | * | 5/1972 | Stacey |
| 4,657,457 A | * | 4/1987 | Rickwood |

FOREIGN PATENT DOCUMENTS

| | | |
|---|---|---|
| GB | 2229241 A | 9/1990 |
| GB | 2300890 A | 11/1996 |
| GB | 2324580 A | 10/1998 |
| GB | 2330637 A | 4/1999 |

* cited by examiner

Primary Examiner—Flemming Saether
(74) Attorney, Agent, or Firm—Jeffer, Mangels, Butler & Marmaro LLP

(57) ABSTRACT

A screw retention device is disclosed for maintaining at least a pair of screws in a substantially static position. The screw retention device preferably includes at least two clamping portions, each clamping portion defining a recess therein for receiving and securely retaining a screw. The clamping portions include a serrated surface extending circumferentially around an inside periphery of the clamping portion, surrounding the recess. The serrated surface of the clamping portion corresponds to and engages with a serrated surface on the screw to retain the screw. In a preferred embodiment of the invention, the screw retention device is press fitted onto the screws.

16 Claims, 4 Drawing Sheets

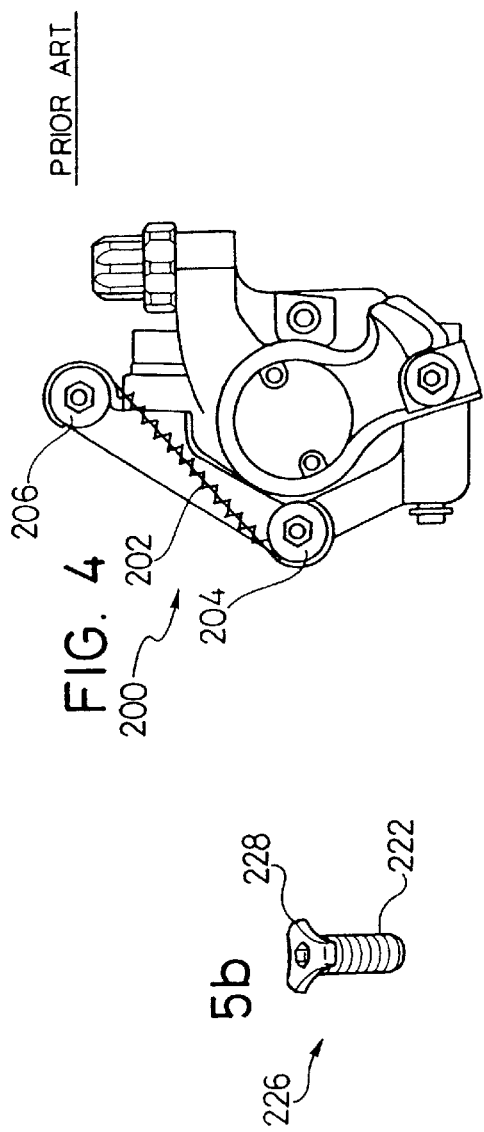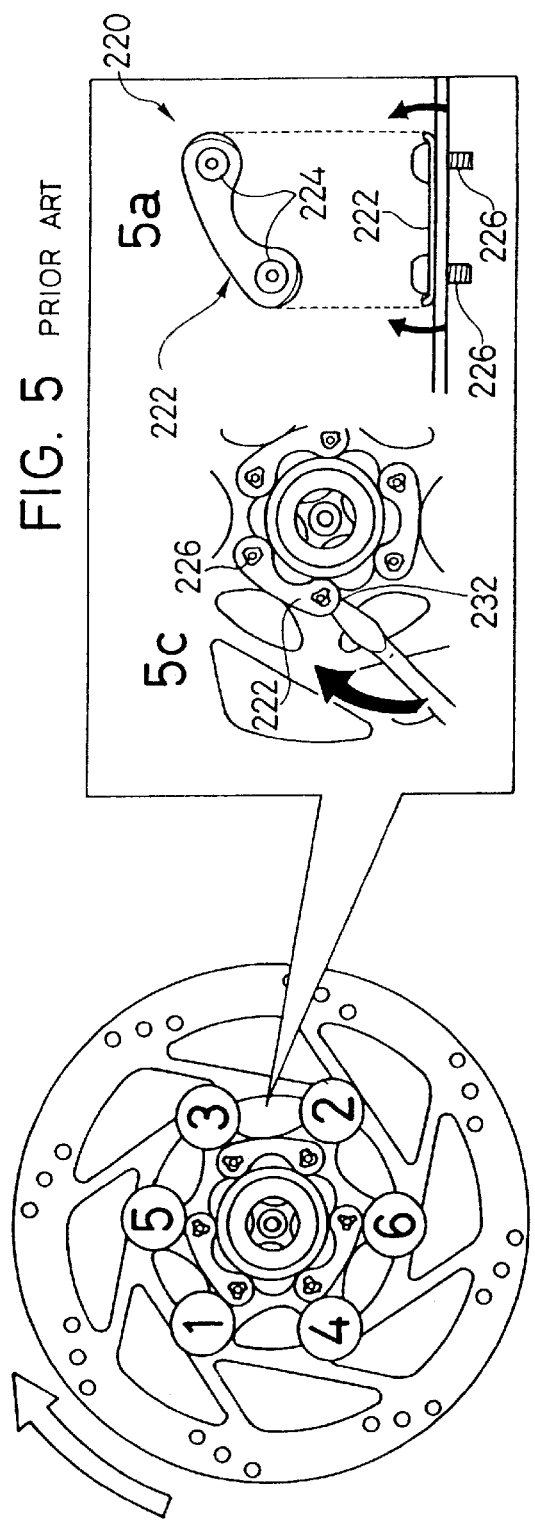

SCREW RETENTION DEVICE HAVING SERRATIONS

FIELD OF THE INVENTION

The present invention relates generally to screw retention devices, and more particularly to a screw retention device having a serrated holding portion for engagement with corresponding serrations on a screw to be retained.

BACKGROUND OF THE INVENTION

When using a fastener, such as a screw, there is a risk that vibrations, or other conditions, will cause the screw to shift in position, loosen and, in some cases, fall out. To prevent the screw from shifting or falling out, numerous screw retention devices and methods have been developed. As shown in FIG. 4, a known device 200 is disclosed for preventing fall out. The device 200 includes a wiring mechanism 202 that is used to wire a pair of tightened screw heads 204, 206 together.

Another known device 220 is shown in FIGS. 5a–5c. The known device 220 includes a tightening plate 222, best shown in FIG. 5a, having a pair of holes 224 dimensioned to receive screws 226. The screws 226, as best shown in FIG. 5b, have a triangular head portion 228 and a threaded shaft 230. To install the tightening plate 222, the screw shaft 230 is positioned through a hole 224 of the tightening plate 222 prior to being threadingly engaged with another object. As shown in FIG. 5c, each tightening plate 222 receives two screws 226. When the screws are fastened, the edge 232 of the tightening plate 222 is bent in the direction designated as X, shown in FIG. 5c, to fit the shape of the screw. When the edges 232 are bent around the screw 226, the bent edges prevent the triangular head 228 from rotating. Thus, the screw 226 is maintained in position.

The known methods of retaining screws in a static position are complicated and time consuming. Accordingly, there is a need for a simplified method and device to retain screws in a static position.

SUMMARY OF THE PREFERRED EMBODIMENTS

A screw retention device is disclosed for maintaining at least a pair of screws in a substantially static position. The term screw is used herein to refer to any fastener that threadingly engages an object. The screw retention device preferably includes at least two clamping portions, each clamping portion defining a recess therein for receiving and securely retaining a screw. The clamping portions include a serrated surface extending circumferentially around an inside periphery of the clamping portion, surrounding the recess. The serrated surface of the clamping portion corresponds to and engages with a serrated surface on the screw to retain the screw. In a preferred embodiment of the invention, the screw retention device is press fitted onto the screws.

In one embodiment of the invention, the serrated surface of the clamping portion extends around the entire inside periphery of the clamping portion and the serrated surface of the screw extends around the entire outside periphery of the screw. The screw retention device is snap fit onto the screws and the serrated surface of the clamping portions engage the serrated surface of the screws.

The screws preferably have a conical head portion to facilitate the installation of the screw retention device. During installation, the clamping portions slide down the conical head portion of the screw until the serrated surface of the clamping portions engages the serrated surface of the screw. In a more preferred embodiment, the conical head portion of the screw is dimensioned to overlap the top surface of the screw retention device when the device is installed, and restrict the movement of the device in the direction of the axis of the screw.

The screw retention device is preferably made of an elastic material that provides elastic yield during the installation of the device. In one embodiment of the invention, the screw retention device comprises rubber. In another embodiment of the invention, the screw retention device comprises a relatively harder material, such as plastic. If a relatively harder material is used, slits are provided in the screw retention device, extending from the recess, to facilitate the installation of the device.

In another preferred embodiment of the invention, the clamping portions include a serrated surface and a non-serrated surface on the inside periphery surrounding the recess. The non-serrated surface is preferably disposed proximal the slit. To facilitate the removal of the screw retention device from the screws, the clamping portions preferably include a pair of extension handles. The extension handles operate such that by pulling the handles apart, the recess is expanded and the serrated surface of the clamping portion disengages from the serrated surface of the screw.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which:

FIG. 4 is a known screw retention device which tightens about the screw heads; and FIGS. 5a through 5c depict a known tightening plate, shown separately and as installed in connection with a plurality of screws.

Like numerals refer to like parts throughout the several views of the drawings.

DETAILED DESCRIPTION OF THE PREFERRED EMBODIMENTS

Figure 1:
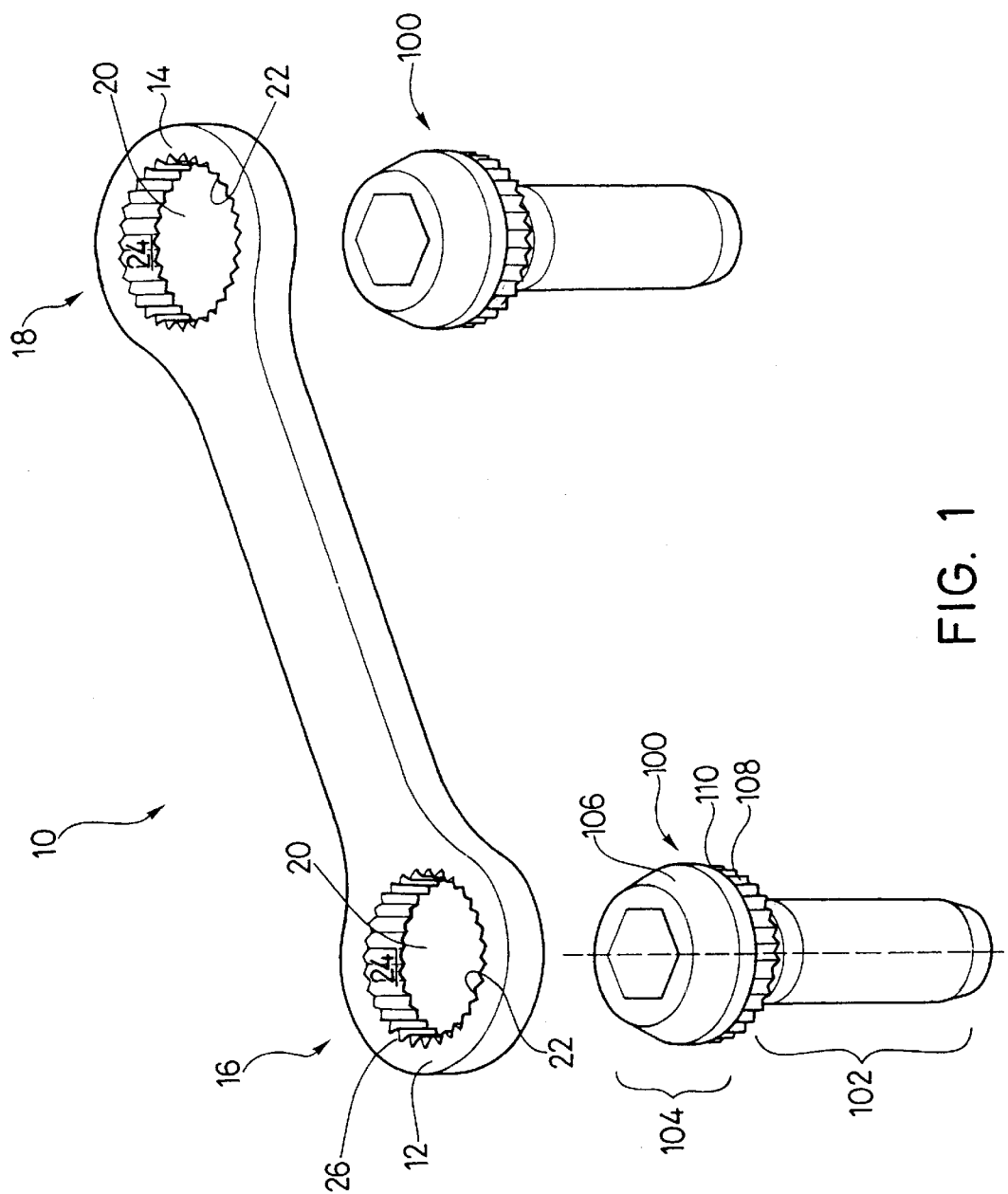
FIG. 1 is a perspective view of a preferred embodiment of the screw retention device of the present invention shown in conjunction with a pair of screws.

A preferred embodiment of the screw retention device of the present invention is shown in FIG. 1 and designated as numeral 10. Screw retention device 10 has a first screw engagement portion 16 at a first end 12 of the screw retention device 10 and a second screw engagement portion 18 at a second end 14 of the screw retention device 10. The first and second screw engagements portions 16, 18 each define a bore 20 therein. The bore 20 is preferably dimensioned to receive a screw 100 and securely retain the screw 100 in the bore 20. On an inside circumference 22 of the screw engagement portions 16, 18, surrounding the bore 20, the screw engagement portions 16, 18 preferably include a serrated surface 24. In a preferred embodiment of the invention, the serrated surface 24 extends circumferentially along the entire inside circumference 22 of the screw engagement portions 16, 18. In another embodiment of the invention, the serrated surface 24 extends partially along the inside circumference 22 of the screw engagement portions 16, 18 (not shown).

The screw retention device 10 is configured to be used in conjunction with screws having a serrated section, as described more fully below. As shown in FIG. 1, screw 100 includes a shaft 102 and a head 104. In a preferred embodiment of the invention, the head 104 includes a conical section 106 and a serrated section 108. The serrated section 108 of the screw 100 is configured to correspond to and engage with the serrated surface 24 of the screw engagement portions 16, 18, when the screw retention device 10 is installed on the screw 100.

In a preferred embodiment of the invention, the screw retention device 10 engages two screws 100. When installed, the first engagement portion 16 of the screw retention device 10 engages a first screw and the second engagement portion 18 of the screw retention device 10 engages a second screw. Specifically, the serrated surfaces 24 of the engagement portions 16, 18 are configured to engage the serrated section 108 of the screws 100. To install the screw retention device 10 on the screws 100, the first and second engagement portions 16, 18 are aligned with the first and second screws, respectively. The screw retention device is pressed onto the screws until the engagement portions 16, 18 slip over the conical section 106 of the screws. The shape of the conical section 106 facilitates the movement of the engagement portions 16, 18 toward the serrated section 108. Upon passing the conical section 106 of the screw, the serrated surfaces 24 of the engagement portions 16, 18 mesh with the serrated sections 108 of the screws. When the serrated surfaces 24 engages the serrated sections 108 of the screws, the screws are substantially maintained in a static position until the screw retention device is removed.

The conical section 106 of the screw 100 is preferably dimensioned to restrict the movement of the screw retention device 10. Specifically, when the screw retention device 10 is installed on the screw 100, the edge 110 of the conical section 106 of the screw 100 at least partially overlaps the top surface 26 of the screw retention device 10, such that, the motion of the screw retention device 10 is restricted in the direction of the center axis A of the screw 100.

To facilitate the installation of the screw retention device 10 on the screws, the screw retention device 10 is preferably comprised of an elastic material that provides elastic yield when the screw retention device 10 is pressed onto the head portion 104 of the screw 100. In a more preferred embodiment of the invention, the screw retention device 10 comprises rubber. The elasticity of the screw retention device 10 allows the device to be snap-fit (or press fit) onto the head portion 104 of the screw.

In the embodiment of the invention shown in FIG. 1, the screw retention device 10 immobilizes a pair of screws 100 simultaneously. The screw retention device 10, shown in FIG. 1, includes two engagement portions 16, 18 each engagement portion engaging a screw. In another embodiment of the invention (not shown), the screw retention device 10 includes three or more engagement portions, each engagement portion engaging one screw. The screw retention device 10 operates in the same manner as the previous embodiment in that the serrated surface 24 of each engagement portion 16, 18 engages the serrated section 108 of a screw 100. However, additional engagement portions can be added, and the length and shape of the screw retention device can be altered to accommodate additional screws, without departing from the inventive concept disclosed herein.

Figure 2:
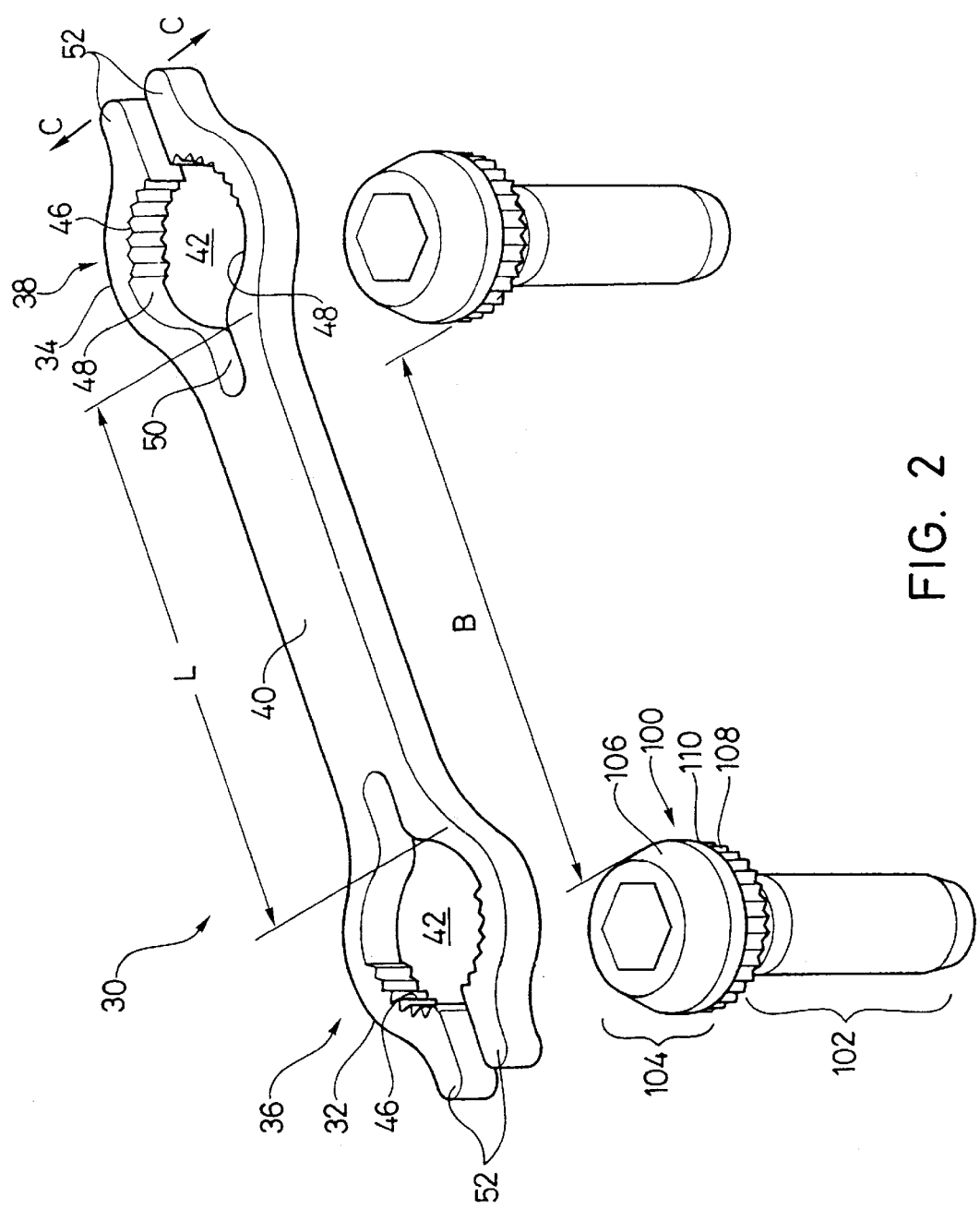
FIG. 2 is a perspective view of another preferred embodiment of the screw retention device of the present invention shown in conjunction with a pair of screws.

Yet another preferred embodiment of the screw retention device of the present invention is shown in FIG. 2 and designated as numeral 30. Screw retention device 30 has a first clamping portion 36 at a first end 32 of the screw retention device 30 and a second clamping portion 38 at a second end 34 of the screw retention device 30. The first and second clamping portions 36, 38, are connected to each other by a connecting arm 40. Each of the first clamping portion 36 and the second clamping portion 38 define a recess 42 therein. The recess is preferably dimensioned to receive a screw 100 and securely retain the screw 100 in the recess 42.

In a preferred embodiment of the invention, as shown in FIG. 2, the clamping portions 36, 38 each have an the inside circumference 44, The inside circumference 44 of the clamping portions 36, 38 preferably carries a serrated portion 46 and a non-serrated portion 48. The serrated portion 46 preferably, at least partially, surrounds the recess 42 at a location distal from the connecting arm 40. The non-serrated portion 48 preferably, at least partially, surrounds the recess 42 at a location proximal the connecting arm 40.

In a preferred embodiment of the invention, the screw retention device 30 comprises a relatively rigid material. Specifically, the material of the screw retention device 30 shown in FIG. 2 is more rigid than the material of the screw retention device 10 shown in FIG. 1. In a preferred embodiment of the invention, the material of the screw retention device 30, shown in FIG. 2; provides an elastic yield to facilitate the installation of the screw retention device 30 onto the screws 100 and the removal of the screw retention device 30 therefrom. In a more preferred embodiment of the invention, the screw retention device 30 comprises plastic.

In one embodiment of the invention, the screw retention device 30 engages two screws 100, as shown in FIG. 2. To install the screw retention device 30, the first clamping portion 36 of the screw retention device 30 is aligned with a first screw and the second clamping portion 38 of the screw retention device 30 is aligned with a second screw. The screw retention device is then pressed onto the screws until the clamping portions 36, 38 slip over the conical section 106 of the screws. As discussed above, the shape of the conical section 106 facilitates the movement of the clamping portions 36, 38 toward the serrated section 108 of the screw. Upon passing the conical section 106 of the screw, the serrated portion 46 of the clamping portions 36, 38 mesh with the serrated sections 108 of the screws. When the serrated portions 46 engage the serrated sections 108 of the screws, the screws are substantially maintained in a static position until the screw retention device 30 is removed.

The screw retention device 30 preferably includes a slit 50 extending from each of the first and second clamping portions 36, 38 in the direction of the connecting arm 40. Because the screw retention device 30 is made of a relatively rigid material, the slits 50 facilitate the deformation of the clamping portions 36, 38 as the screw retention device 30 is installed on the screws. Specifically, as the clamping portions 36, 38 are pressed over the head 104 of the screw 100, the slit 50 allows the recess 42 of the clamping portion 36, 38 to expand. The recess remains expanded as the screw retention device 30 is pressed over the conical section 106 of the screw. When the serrated portion 46 of the clamping portion 36, 38 arrives at the serrated section 108 of the screw, the screw retention device 30 snaps back into its normal state from its expanded state.

Since the screw retention device 30 of the embodiment shown in FIG. 2 is made of a relatively rigid material, the connecting arm 40 is difficult to compress in the longitudinal direction. Accordingly, to fit the screw retention device 30 on the screws, the length of the connecting arm, L, must be equivalent or shorter than the distance, B, between the screws. In the event that the distance between the screws, B, is slightly larger than the length of the connecting arm, L, the clamping portions 36, 38 will still be able to engage the serrated sections 108 of the screws. Namely, the serrated portion 46 of the clamping portion 36, 38 meshes with the serrated section 108 and securely maintains the screw in place. To retain the position of a screw, it is not required that the screw retention device 30 include a serrated portion 46 that extends circumferentially around the entire inside circumference 44 of the clamping portions 36, 38. As shown in FIG. 2, and discussed above, the serrated portion 46 extends partially around the inside circumference 44 of the clamping portions 36, 38. By providing the serrated portion 46 at a location distal from the connecting arm 40, the screw retention device 30 can engage the serrated section 108 of a pair of screws that are apart a distance that is greater than the length of the connecting arm, L.

The screw retention device 30 preferably includes handles 52. In a preferred embodiment of the invention, the handles 52 are integrally attached to and extend from the clamping portion 36, 38. When the screw retention device 30 is installed on the screws 100, the handles 52 are used to facilitate the removal of the screw retention device 30 from the screws. Specifically, the handles 52 are preferably pulled apart in the direction depicted as C in FIG. 2. By pulling the handles 52 apart, the recess 42 of the clamping portions 36, 38 is expanded and the serrated portion 46 of the screw retention device is disengaged from the serrated section 108 of the screw. The screw retention device can then be removed from the screws.

As discussed with respect to the embodiment shown in FIG. 1, the screw retention device 30 is not limited to having two clamping portions 36, 38. The screw retention device 30 can include three or more clamping portions, each clamping portion engaging one screw. The screw retention device having three or more clamping portions would operate in the same manner as the embodiment shown in FIG. 2, in that the serrated portion 46 of each clamping portion engages the serrated section of a screw 100. As such, additional clamping portions can be added, and the length and shape of the screw retention device can be altered to accommodate additional screws, without departing from the inventive concept disclosed herein.

Figure 3:
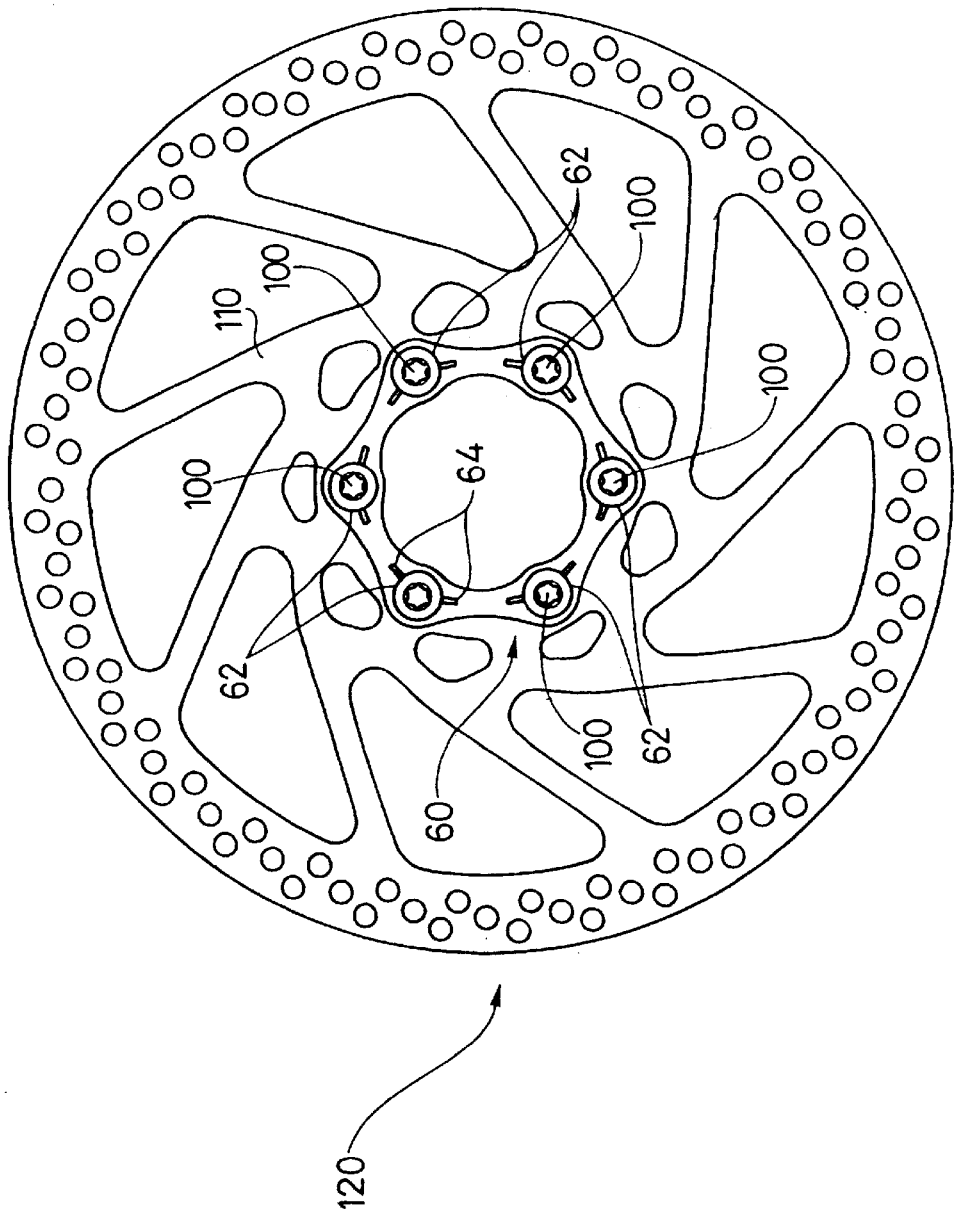
FIG. 3 is a top plan view of yet another preferred embodiment of the screw retention device of the present invention as installed.

An alternative embodiment of the screw retention device of the present invention is shown in FIG. 3 and designated as numeral 60. In this embodiment of the invention, the screw retention device 60 has a plurality of clamping portions 62. Each clamping portion includes a pair of slits 64 to accommodate a yield in the material of the screw retention device during installation. The clamping portions 62 each have a serrated portion 66 (not shown) that engages the serrated section 108 of the screw and retains the screw in a substantially static position.

In the embodiment shown in FIG. 3, six screws 100 are installed on a disc brake rotor 120 in a circular relationship. The shape of the screw retention device 60 substantially corresponds to the layout of the screws 100. Each clamping portion 62 is configured to align and engage with a corresponding screw. To install, the screw retention device 60 is snap fit or press fit onto the plurality of screws. Although FIG. 3 depicts a disc brake rotor, the present invention is not limited to be used solely in such an application. Rather, the screw retention device can be used in any application wherein it is desirable to maintain a plurality of fasteners in a substantially static position.

The embodiments described above are exemplary embodiments of a screw retention device. Those skilled in the art may now make numerous uses of, and departures from, the above-described embodiments without departing from the inventive concepts disclosed herein. Accordingly, the present invention is to be defined solely by the scope of the following claims.

What is claimed is:

1. A screw retention assembly, comprising:
   at least two serrated screws;
   a screw retention device comprising:
   a body;
   at least two screw engagement portions integrally attached to the body, each engagement portion comprising a circular loop having an inner periphery, wherein the engagement portions are dimensioned to securely engage the at least two serrated screws;
   a serrated portion disposed on the inner periphery of the circular loop and dimensioned to grip the at least two serrated screws;
   a smooth, non-serrated portion continuous along the inner periphery of the circular loop; and
   a connecting arm associating the at least two screw engagement portions.

2. The screw retention device of claim 1 comprising a rubber material.

3. The screw retention device of claim 1 comprising a plastic material.

4. The screw retention device of claim 1 wherein each of the at least two screw engagement portions comprises a slit therein extending into the connecting arm.

5. A screw retention assembly, comprising;
   a serrated screw having a head with an upper conical section and a lower serrated circumference;
   a screw retention device comprising at least two screw engagement portions associated with each other by a connecting arm, each of the at least two screw engagement portions comprising a continuous circular loop and defining a recess therein, wherein the at least two engagement portions are attached to the connecting arm and wherein the recess is dimensioned to receive the serrated screw; and
   a serrated surface disposed, at least partially, along an inside periphery of each of the at least two screw engagement portions surrounding the recess, the serrated surface corresponding to and dimensioned to engage with the serrated circumference of the screws;
   wherein the loop is expandable over the upper conical section.

6. The screw retention device of claim 5 comprising an elastic material.

7. The screw retention device of claim 5 comprising a rubber material.

8. The screw retention device of claim 5 wherein each of the at least two screw engagement portions include a slit extending from the recess.

9. The screw retention device of claim 5 wherein the serrated surface extends along the entire periphery of each of the at least two screw engagement portions.

10. A screw retention device for retaining serrated screws having a head with an upper conical section and a lower serrated circumference, the screw retention device comprising:

at least two screw engagement portions associated with each other by a connecting arm, each of the at least two screw engagement portions defining a recess therein, the recess dimensioned to receive the serrated screw;

a serrated surface disposed, at least partially, along an inside periphery of each of the at least two screw engagement portions surrounding the recess, the serrated surface corresponding to and dimensioned to engage with the serrated circumference of the screws, and wherein each of the at least two screw engagement portions include a pair of extension handles, wherein the recess is expanded by moving the pair of extension handles apart.

11. The screw retention device of claim 10 wherein each of the at least two screw engagement portions include a non-serrated surface proximal the connecting arm.

12. The screw retention device of claim 11 wherein the serrated surface is disposed proximal the pair of extension handles.

13. The screw retention device of claim 12 comprising a plastic material.

14. A method of retaining screws in a substantially static position, comprising the steps of:

providing a pair of screws, each screw having a head comprising of a conical head portion and a serrated circumference adjacent the conical head portion;

providing a screw retention device having a pair of screw engagement portions, wherein each screw engagement portion has an inside circumference defining a bore therein, the bore being dimensioned to receive a screw head, wherein the inside circumference of the screw engagement portion has a serrated surface corresponding to the serrated circumference of the screw;

pressing the screw retention device onto the screw head;

sliding each of the screw engagement portions over the conical head portion of a respective screws; and engaging the serrated surface of each of the screw engagement portions with the serrated circumference of a respective screw.

15. The method of claim 14 wherein the screw head is dimensioned to maintain the screw engagement portion in a static position when the screw retention device is installed.

16. A method of installing a screw retention device on a screw, comprising the steps of:

providing at least two screw engagement portions on the screw retention device, wherein each screw engagement portion has an inside circumference defining a bore therein, the bore being dimensioned to receive a screw head, and wherein the inside circumference of the screw engagement portion has a serrated portion and a non-serrated portion;

providing at least two screws, each screw having a screw head with a serrated portion, and pressing each of the at least two screw engagement portions over a respective screw head and engaging the serrated portion of the screw engagement portion with the serrated portion of the crew head.

* * * * *